(12) United States Patent
Nishiyama

(10) Patent No.: US 10,038,835 B2
(45) Date of Patent: Jul. 31, 2018

(54) IMAGE PICKUP DEVICE AND STILL PICTURE GENERATING METHOD

(71) Applicant: Panasonic Intellectual Property Management Co., Ltd., Osaka (JP)

(72) Inventor: Akio Nishiyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/337,032

(22) Filed: Oct. 28, 2016

(65) Prior Publication Data

US 2017/0048448 A1    Feb. 16, 2017

Related U.S. Application Data

(63) Continuation of application No. PCT/JP2016/003096, filed on Jun. 28, 2016.

(30) Foreign Application Priority Data

Jul. 7, 2015  (JP) ................................. 2015-135967

(51) Int. Cl.
*H04N 5/232* (2006.01)
*G02B 7/28* (2006.01)
(Continued)

(52) U.S. Cl.
CPC ............ *H04N 5/23212* (2013.01); *G02B 7/28* (2013.01); *G02B 7/36* (2013.01); *G03B 7/091* (2013.01);
(Continued)

(58) Field of Classification Search
None
See application file for complete search history.

(56) References Cited

U.S. PATENT DOCUMENTS

2010/0074606 A1   3/2010  Sasaki
2010/0128163 A1   5/2010  Nagasaka et al.
(Continued)

FOREIGN PATENT DOCUMENTS

JP    2004-135029 A    4/2004
JP    2005-277813 A    10/2005
(Continued)

OTHER PUBLICATIONS

The Extended European Search Report dated Mar. 10, 2017 for the related European Patent Application No. 16788002.0.
(Continued)

*Primary Examiner* — Mark T Monk
(74) *Attorney, Agent, or Firm* — Renner Otto Boisselle & Sklar, LLP

(57) ABSTRACT

An image pickup device includes an optical system, an imaging element, an image processor, an input unit, and a controller. The optical system includes a focus lens. The imaging element generates an image signal from optical information that is input via the optical system. The image processor performs a predetermined process on the image signal generated by the imaging element, and then generates moving picture data including a plurality of frame images. The input unit receives input of a designated region on an image made by a user. The controller causes the image processor to generate the moving picture data while moving a focus position of the optical system, and then extracts a still picture that is in focus on the designated region from among the plurality of frame images included in the moving picture data.

9 Claims, 15 Drawing Sheets

(51) Int. Cl.
*G02B 7/36* (2006.01)
*G03B 7/091* (2006.01)
*G03B 13/36* (2006.01)
*H04N 5/225* (2006.01)
*H04N 5/91* (2006.01)

(52) U.S. Cl.
CPC ............ *G03B 13/36* (2013.01); *H04N 5/225* (2013.01); *H04N 5/232* (2013.01); *H04N 5/23216* (2013.01); *H04N 5/23293* (2013.01); *H04N 5/91* (2013.01)

(56) References Cited

U.S. PATENT DOCUMENTS

| | | |
|---|---|---|
| 2011/0044386 A1 | 2/2011 | Chen et al. |
| 2011/0298964 A1 | 12/2011 | Hikida |
| 2013/0176461 A1* | 7/2013 | Hayashi ............ H04N 1/00427 348/231.99 |
| 2014/0009636 A1* | 1/2014 | Lee .................... H04N 5/23212 348/222.1 |
| 2014/0049611 A1 | 2/2014 | Woo et al. |
| 2014/0176783 A1 | 6/2014 | Shibagami |

FOREIGN PATENT DOCUMENTS

| | | |
|---|---|---|
| JP | 2008-252685 A | 10/2008 |
| JP | 2010-503296 A | 1/2010 |
| JP | 2010-097167 A | 4/2010 |
| JP | 2010-206552 A | 9/2010 |
| JP | 2013-088579 A | 5/2013 |
| JP | 2015-023487 A | 2/2015 |

OTHER PUBLICATIONS

International Search Report and Written Opinion for corresponding International Application No. PCT/JP2016/003096 dated Aug. 9, 2016.

* cited by examiner

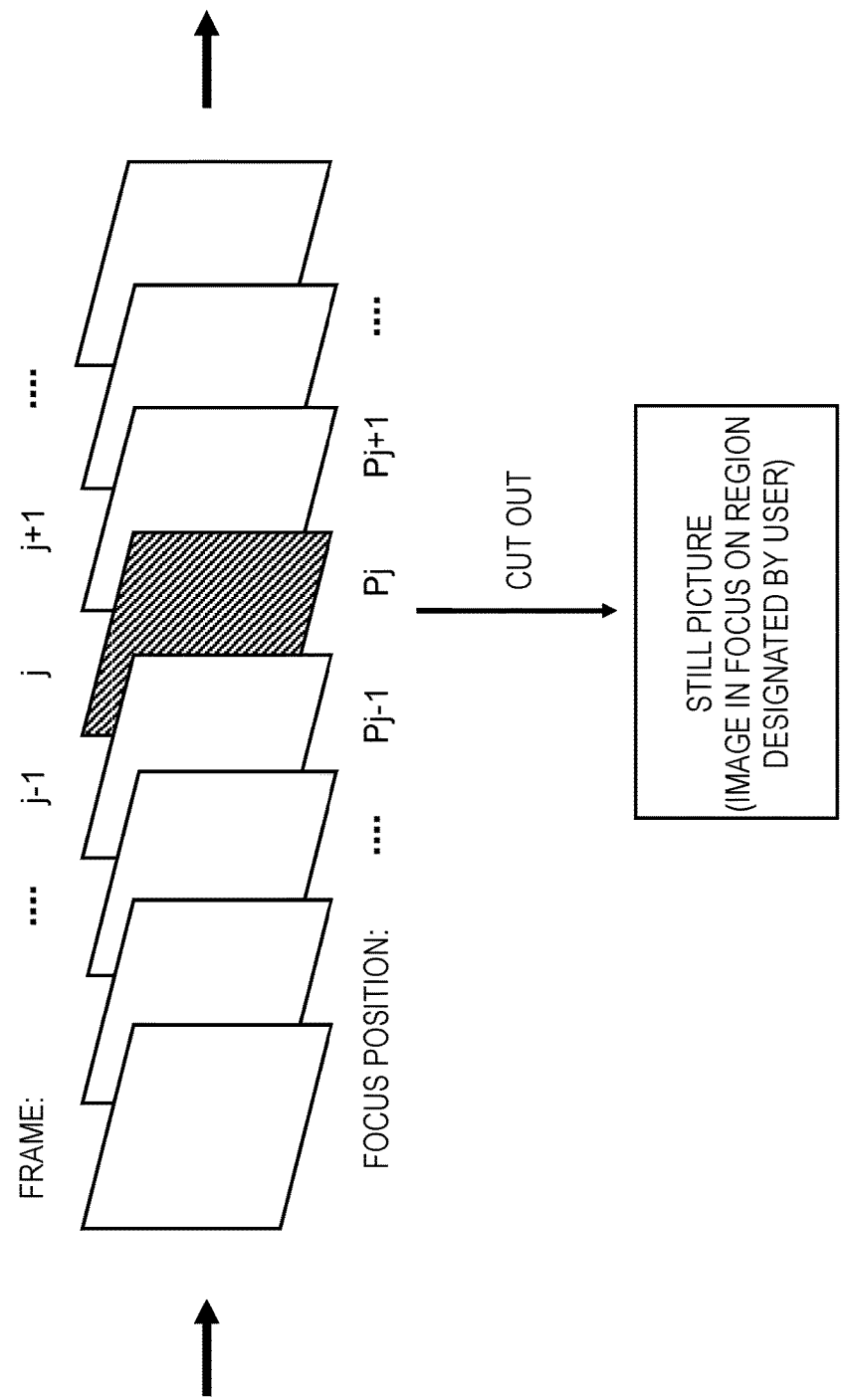

FOCUS INFORMATION TABLE 60

| LENS POSITION IN FOCUS ON CLOSEST END SIDE (Pnear) | LENS POSITION IN FOCUS ON MOST INFINITE END SIDE (Pfar) | FRAME IN FOCUS OF REGION 1 | FRAME IN FOCUS OF REGION 2 | FRAME IN FOCUS OF REGION 3 | ... | ... |
|---|---|---|---|---|---|---|
| 5 | 150 | 5 | 50 | 36 | ... | ... |

HEADER 63 | AV DATA 65

IMAGE PICKUP DEVICE AND STILL PICTURE GENERATING METHOD

BACKGROUND

1. Technical Field

The present disclosure relates to an image pickup device and a still picture generating method capable of recording an image in focus on an image region designated by a user.

2. Description of the Related Art

Digital cameras have functions including a focus bracketing function to perform continuous capturing while moving focal positions. This function allows a user to select an image in a desired focus state after capturing images.

Unexamined Japanese Patent Publication No. 2004-135029 discloses a digital camera that has the focus bracketing function. This digital camera has a calculation section and a control section. The calculation section calculates a focus evaluation value that indicates a focus state of each of a plurality of images continuously captured by capturing using the focus bracketing capturing function. The control section selects an image in a good focus state based on the focus evaluation value of each of the plurality of images calculated by the calculation section, and then the control section controls an operation of a recording section to record image data indicating the selected image on a recording medium. This enables selection and recording of the image in a good focus state from the plurality of captured images.

SUMMARY

The present disclosure provides an image pickup device and a still picture generating method that allow the user to easily acquire a still picture in focus on a desired image region (subject).

The first aspect of the present disclosure provides an image pickup device. The image pickup device includes an optical system, an imaging element, an image processor, an input unit, and a controller. The optical system includes a focus lens. The imaging element generates an image signal from optical information that is input via the optical system. The image processor performs a predetermined processing on the image signal generated by the imaging element to generate moving picture data including a plurality of frame images. The input unit receives input of a designated region on the image made by a user. The controller causes the image processor to generate the moving picture data while moving a focus position of the optical system, and then extracts a still picture that is in focus on the designated region from the plurality of frame images included in the moving picture data.

The second aspect of the present disclosure provides a still picture generating method in an image pickup device. The still picture generating method includes the steps of generating moving picture data including a plurality of frame images while moving a focus position, receiving input of a designated region on an image made by a user, and extracting a still picture that is in focus on the designated region from the plurality of frame images included in the moving picture data.

BRIEF DESCRIPTION OF DRAWINGS

FIG. 4 is a diagram illustrating cutting out of a still picture from moving picture data.

DETAILED DESCRIPTION

Exemplary embodiments will be described in detail below with reference to the drawings as appropriate. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the exemplary embodiments. It is to be noted that the inventers provide the accompanying drawings and the following description in order for a person skilled in the art to fully understand the present disclosure, and do not intend to limit the subject described in the appended claims.

Exemplary embodiments of an image pickup device according to the present disclosure will be described below with reference to the drawings.

First Exemplary Embodiment

1. Configuration of Digital Camera

Figure 1:
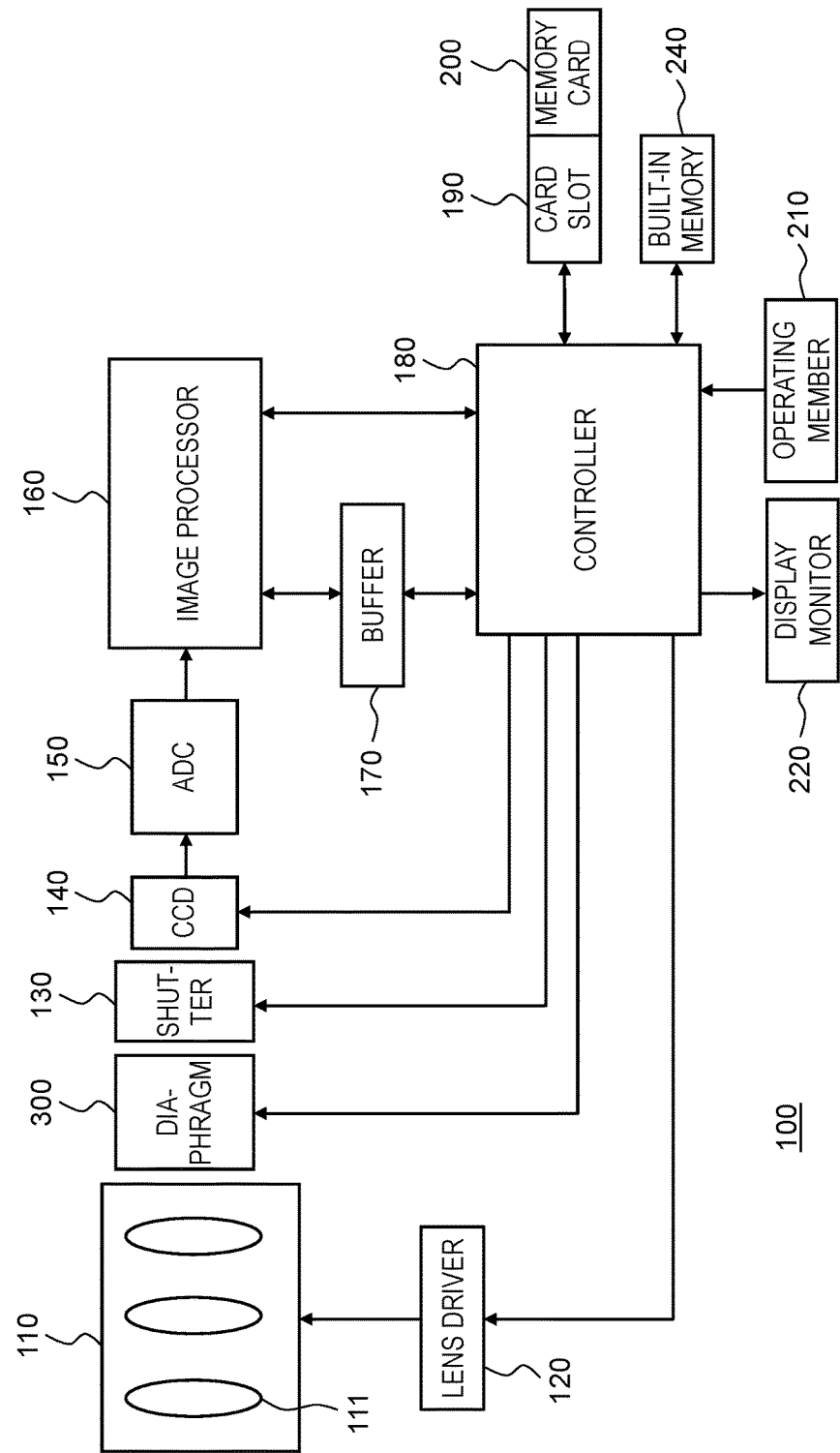
FIG. 1 is a diagram illustrating a configuration of a digital camera according to the present disclosure.

An example of an electric configuration of a digital camera according to the first exemplary embodiment will be described with reference to FIG. 1. FIG. 1 is a block diagram illustrating the configuration of digital camera 100. Digital camera 100 is an image pickup device that captures a subject image formed by optical system 110 including one or more lenses with charge-coupled device (CCD) 140. Image data generated with CCD 140 undergoes various processes performed by image processor 160 and is stored in memory card 200. The configuration of digital camera 100 will be described in detail below.

Optical system 110 includes a zoom lens and focus lens 111. Optical system 110 can enlarge or reduce the subject image by moving the zoom lens along an optical axis. In addition, optical system 110 can adjust focus of the subject image (focus state) by moving focus lens 111 along the optical axis. Lens driver 120 drives various lenses included in optical system 110.

Lens driver 120 includes, for example, a zoom motor that drives the zoom lens and a focus motor that drives focus lens 111.

Diaphragm 300 adjusts a size of an aperture in response to user settings or automatically to adjust an amount of light that passes through the aperture.

Shutter 130 is a section that blocks light that passes through shutter 130 and reaches CCD 140. Shutter 130 constitutes an optical system section that controls optical information indicating the subject image together with optical system 110 and diaphragm 300. Also, optical system 110 and diaphragm 300 are accommodated in a lens body tube (not illustrated).

CCD 140 captures the subject image formed by optical system 110 and then generates image data. CCD 140 includes a color filter, a light-receiving element, and an auto gain controller (AGC). The light-receiving element converts an optical signal concentrated by optical system 110 into an electric signal to generate image information. The AGC amplifies the electric signal that is output from the light-receiving element. CCD 140 further includes a drive circuit for performing various operations such as exposure, transfer, and electronic shutter. Details will be described later.

Analog-digital converter (A/D converter) (ADC) 150 converts the analog image data generated by CCD 140 into digital image data.

In response to control performed by controller 180, image processor 160 performs various processing on the digital image data that is generated by CCD 140 and converted. Image processor 160 generates image data to be displayed on display monitor 220, and generates image data to be stored in memory card 200. For example, image processor 160 performs various processing, such as gamma correction, white balance correction, and flaw correction, on the image data generated by CCD 140. In addition, image processor 160 compresses the image data generated by CCD 140 in accordance with a compression format that complies with the 11.264 standard, the Moving Picture Experts Group (MPEG) 2 standard, or the like. Image processor 160 can be implemented by a digital signal processor (DSP), a microcomputer, and the like. In addition, based on the image data generated by CCD 140, image processor 160 can generate, for example, image data of a moving picture with a number of pixels of around 4000×2000 (4K moving picture data). Image processor 160 can perform various processes to be described later on the generated 4K moving picture data.

Controller 180 is a control section that controls overall digital camera 100. Image processor 160 and controller 180 can be implemented by a semiconductor device or the like. Controller 180 may be configured using only hardware and may be implemented by combining hardware and software. Image processor 160 and controller 180 can be implemented by a microcomputer, a central processing unit (CPU), a microprocessor unit (MPU), a DSP, an application specific integrated circuit (ASIC), a field-programmable gate array (FPGA), and the like.

Buffer 170 functions as a work memory for image processor 160 and controller 180. Buffer 170 can be implemented, for example, by a dynamic random access memory (DRAM) and a ferroelectric memory.

Card slot 190 is a section for installing memory card 200 in digital camera 100. Card slot 190 allows connection between memory card 200 and digital camera 100 mechanically and electrically.

Memory card 200 contains a flash memory, a ferroelectric memory, or the like therein, and can store data such as image files generated by image processor 160.

Built-in memory 240 includes a flash memory, a ferroelectric memory, or the like. Built-in memory 240 stores a control program, data, and the like for controlling overall digital camera 100.

Operating member 210 is a general term for a user interface that receives operations from a user. Operating member 210 includes a button, lever, dial, touch panel, switch, and the like that receive operations from the user. In addition, operating member 210 includes a focus ring provided in an outer circumference of the lens body tube. The focus ring is a member that receives a rotary operation made by the user for moving focus lens 111.

Display monitor 220 can display an image (through image) indicated by the image data generated by CCD 140 and an image indicated by image data read from memory card 200. In addition, display monitor 220 can display various menu screens for performing various settings of digital camera 100 and the like. Display monitor 220 includes a liquid crystal display device or an organic electroluminescence (EL) display device.

Figure 2:
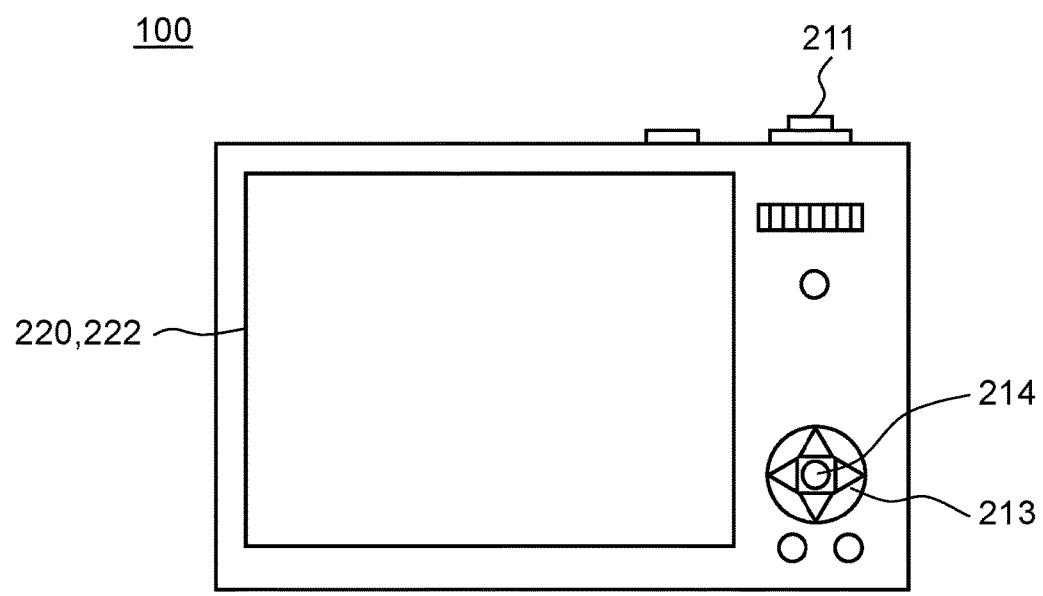
FIG. 2 is a rear view of the digital camera.

FIG. 2 is a diagram illustrating a rear of digital camera 100. FIG. 2 illustrates release button 211, selection button 213, decision button 214, and touch panel 222 as an example of operating member 210. In response to the user operation, operating member 210 transmits various instruction signals to controller 180.

Input of a designated region on the image made by the user can be received using operating member 210 such as touch panel 222. It is to be noted that instead of using operating member 210, the input of a designated region on the image made by the user may be received from outside of digital camera 100 by using a wireless communication function of an unillustrated wireless communication unit such as Wi-Fi. In this case, a receiving unit of the wireless communication unit receives the input of a designated region on the image. Operating member 210 such as touch panel 222 and the wireless communication unit such as Wi-Fi, which receive the input of a designated region on the image made by the user, are generically called an input unit.

Release button 211 is a two-step depression-type button. When release button 211 is half-pressed by the user, controller 180 performs automatic focus control (AF control), automatic exposure control (AE control), and the like. Also, when release button 211 is fully pressed by the user, controller 180 records image data captured at timing of depression operation in memory card 200 or the like as a recorded image. Also, after release button 211 is half-pressed by the user, the user can cancel operations by not performing the full-press operation and canceling the depression of release button 211.

Selection button 213 is a depression-type button provided in up and down, left and right directions. By pressing selection button 213 of one of the up and down, left and right directions, the user can move a cursor or select various condition items displayed on display monitor 220.

Decision button 214 is a depression-type button. When decision button 214 is pressed down by the user while digital camera 100 is in a capturing mode or a playback mode, controller 180 displays a menu screen on display monitor 220. The menu screen is a screen for setting various conditions for capturing/playback. When decision button 214 is pressed down while a setting item of the various conditions is selected, controller 180 decides the setting of the selected item.

Touch panel 222 is disposed such that it is superimposed on a display screen of display monitor 220 and detects a touch operation made by a finger of the user on the display screen. This allows the user to perform operations such as designation of a region on the image displayed on display monitor 220.

1.1 Focus Bracketing Function

Digital camera 100 according to the present exemplary embodiment has a focus bracketing function to capture a moving picture while changing a position in focus and to select and record one frame from a plurality of frame images that constitutes the captured moving picture. The focus bracketing function allows, for example, recording of the 4K moving picture with the number of pixels of around 4000× 2000. Thus, from the moving picture recorded in 4K, one frame image selected based on the user designation is cut out to obtain a still picture.

Figure 3B:
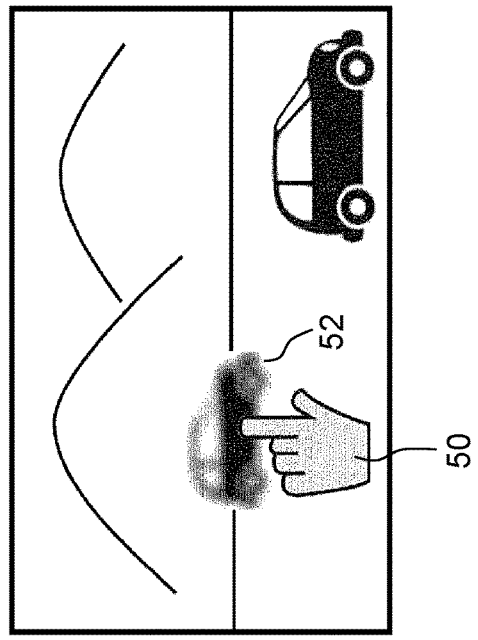
FIG. 3B is a diagram illustrating designation of a region to be in focus in an image made by a user.
Figure 3A:
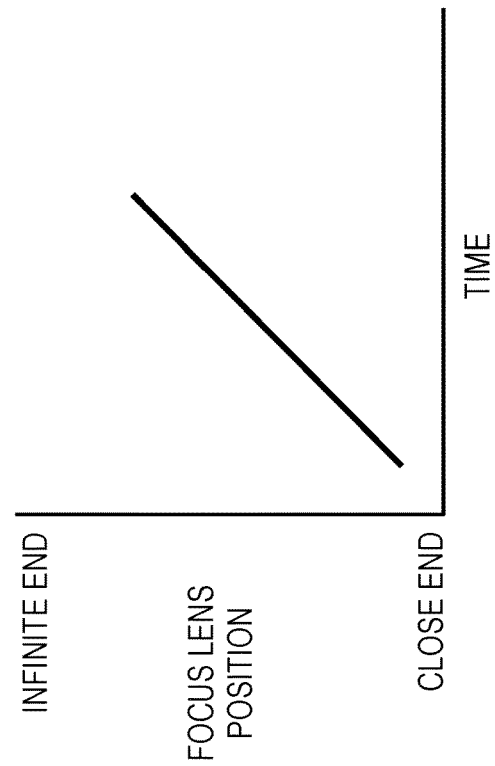
FIG. 3A is a diagram illustrating movement of a focus lens in a bracketing operation.

Specifically, the focus bracketing function is to capture a moving picture while moving focus lens 111 from a close end side toward an infinite end side (or in a direction opposite thereto), that is, while changing the position in focus, as illustrated in FIG. 3A. Subsequently, as illustrated in FIG. 3B, user 50 designates subject 52 (that is, region) to be in focus in the captured image. As illustrated in FIG. 4, from among the plurality of frame images that constitutes the moving picture, digital camera 100 selects one frame image based on the designation made by the user, and then cuts out and records the selected frame image as a still picture. This allows acquisition of the high-quality still picture that is in focus on the subject (region) designated by the user.

Figure 5:
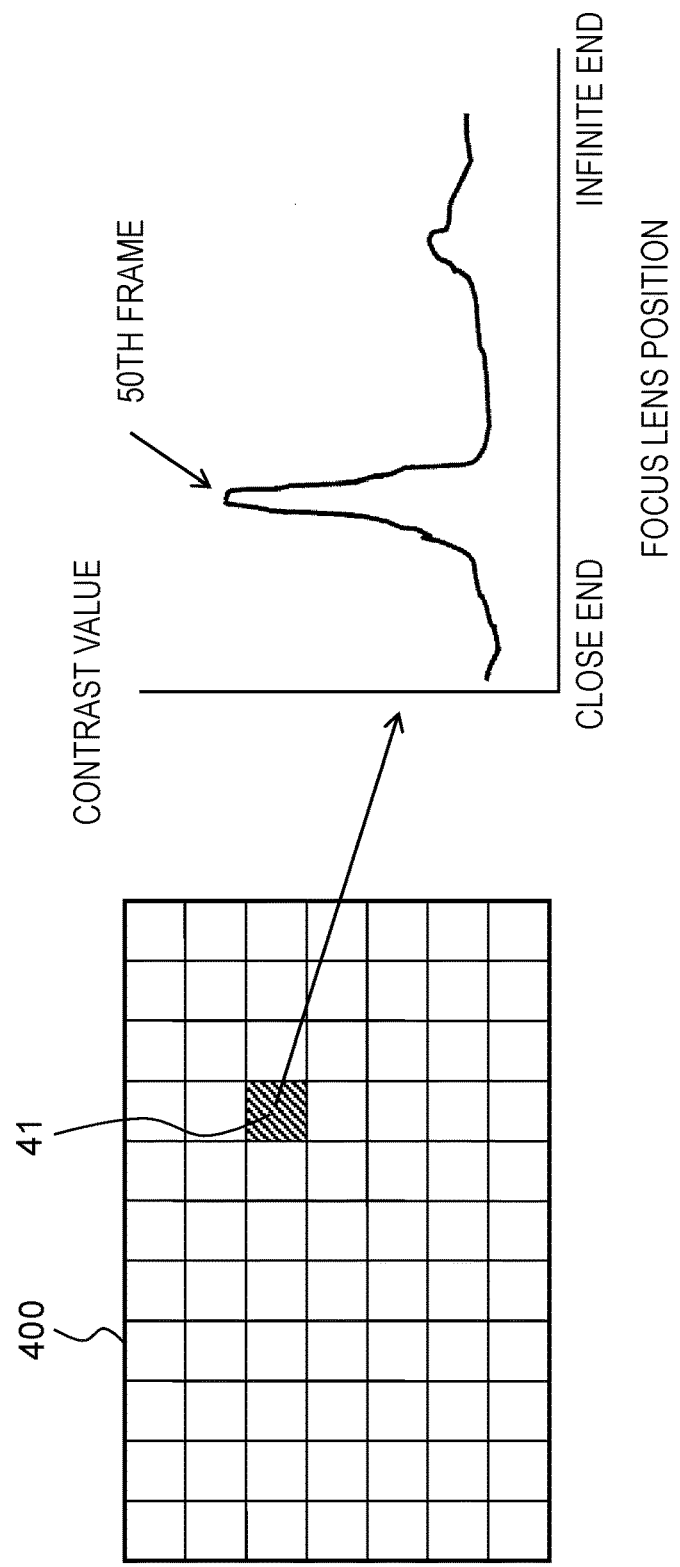
FIG. 5 is a diagram illustrating a plurality of regions divided from an image.

For the purpose of the aforementioned focus bracketing, the present exemplary embodiment divides image region 400 into a plurality of regions as illustrated in FIG. 5. Then, for each of the divided regions, the frame in focus on the region (hereinafter referred to as "frame in focus") is determined from among the plurality of frames that constitutes the moving picture, and then information regarding the determined frame in focus is recorded in a focus information table. Here, before recording (capturing) the moving picture in the focus bracketing operation, digital camera 100 performs a prescan operation and then detects the frame in focus on each divided region to generate the focus information table.

Figures 6A, 6B:
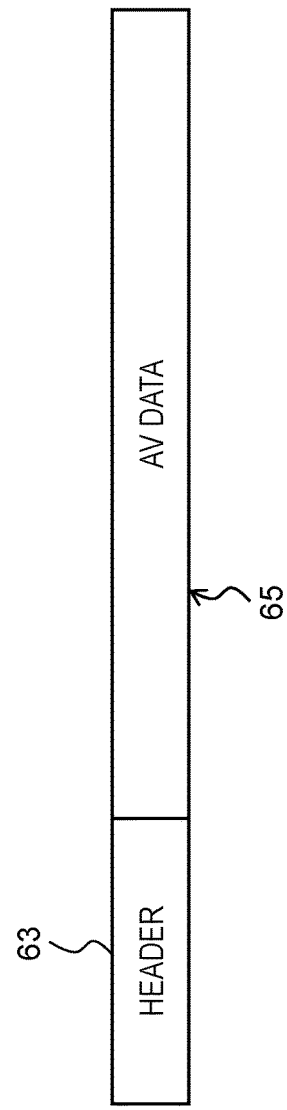
FIG. 6A is a diagram illustrating a focus information table.
FIG. 6B is a diagram illustrating a header of the moving picture data.

FIG. 6A is a diagram illustrating data structure of the focus information table. Focus information table 60 stores a focus lens position when focus is obtained on the closest end side (Pnear) in the prescan operation, a focus lens position when focus is obtained on the most infinite end side (Pfar), and frame numbers of the frames in focus on respective divided regions. Focus information table 60 is stored in header 63 of moving picture data 65 obtained by capturing the moving picture as illustrated in FIG. 6B.

2. Focus Bracketing Operation

The focus bracketing operation of digital camera 100 that has the aforementioned configuration will be described below.

Figure 7:
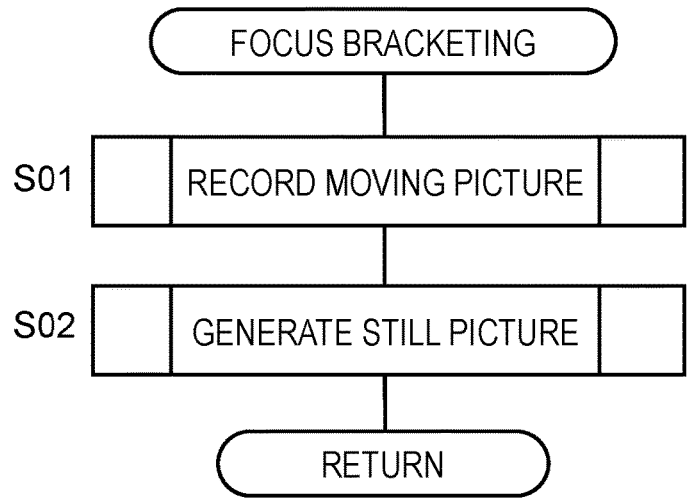
FIG. 7 is a flowchart illustrating a focus bracketing operation.

With reference to a flowchart in FIG. 7, a moving picture recording operation in the focus bracketing operation of digital camera 100 will be described. While the focus bracketing function is validly set in advance to digital camera 100, full press of release button 211 by the user will start the focus bracketing operation. The focus bracketing operation includes a moving picture recording operation (S01) and a still picture generating operation (S02). In the moving picture recording operation, digital camera 100 records (captures) a moving picture while moving focus lens 111. In the still picture generating operation, digital camera 100 generates a still picture in focus on a subject (region) designated by the user from moving picture data recorded in the moving picture recording operation. Each operation will be described in detail below.

2.1 Moving Picture Recording Operation

Figure 8:
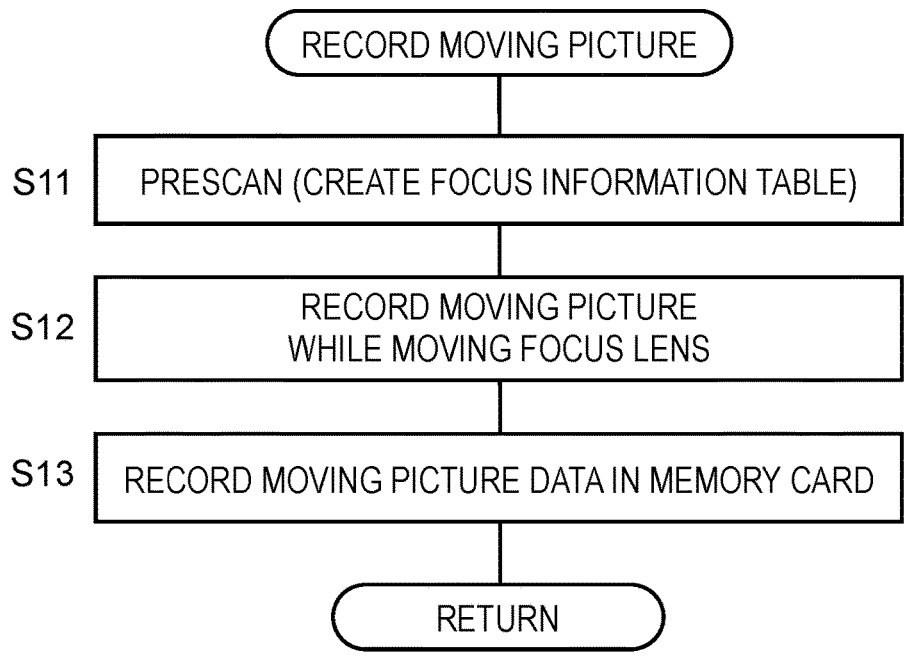
FIG. 8 is a flowchart illustrating a moving picture recording operation in focus bracketing capturing.

FIG. 8 is a flowchart illustrating the moving picture recording operation (step S01). Controller 180 first performs the prescan operation for detecting the position in focus on each divided region in the image and creating the focus information table (S11).

In the prescan operation, controller 180 detects a contrast value in each divided region of the image while moving focus lens 111 from the close end to the infinite end (or in a direction opposite thereto) (refer to FIG. 5).

Then, controller 180 creates focus information table 60 based on a result of the prescan. Specifically, when moving focus lens 111 from the close end to the infinite end, controller 180 determines the frame with the maximum contrast value for each region in the plurality of frame images obtained as the frame in focus. Then, controller 180 records the frame number that indicates the frame in focus in focus information table 60. It is to be noted that when all the contrast values of the frames are lower than a predetermined threshold for one region, the frame in focus (that is, the position in focus) is not determined for the region, and thus focus information table 60 records a predetermined value indicating that the position in focus is unknown.

Controller 180 further determines the position in focus of focus lens 111 on the closest end side (Pnear) and the position in focus of focus lens 111 on the most infinite end side (Pfar) when moving focus lens 111 from the close end to the infinite end. Then, controller 180 records these values in focus information table 60.

Figure 9:
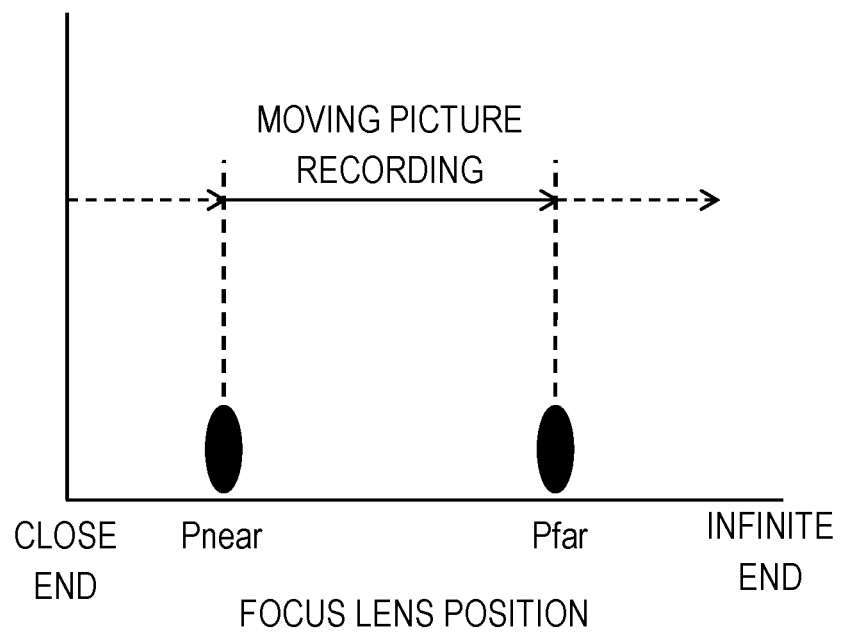
FIG. 9 is a diagram illustrating a movement range of the focus lens in the focus bracketing capturing.

After the prescan operation is finished, controller 180 returns focus lens 111 to the close end side, and then records the moving picture while moving focus lens 111 within a predetermined range (S12). Here, the predetermined range is a range from the position in focus of focus lens 111 on the closest end side (Pnear) to the position in focus of focus lens 111 on the most infinite end side (Pfar), as illustrated in FIG. 9. By limiting a moving range of focus lens 111 to such a range, the moving picture is not recorded in the range in which focus is not obtained, reducing moving picture recording time. It is to be noted that the moving picture is recorded in accordance with a predetermined format for moving picture data. For example, the moving picture is recorded in accordance with the MP4 standard (H. 264/MPEG-4 AVC standard).

After the moving picture recording is finished, controller 180 records in memory card 200 moving picture data 65 with focus information table 60 recorded in header 63 (S13), and then controller 180 finishes the moving picture recording operation.

2.2 Still Picture Generation from Moving Picture Data

With reference to a flowchart in FIG. 10, the still picture generating operation (step S02) will be described. In the still picture generating operation, the still picture in focus on the subject (region) designated by the user is generated from the moving picture captured in the moving picture recording operation.

Figure 11:
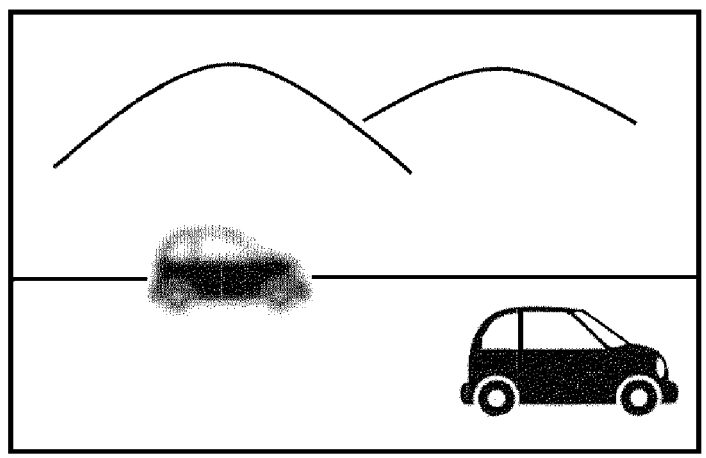
FIG. 11 is a diagram illustrating a screen to be displayed after recording of the moving picture data.

Controller 180 displays the moving picture that is recorded immediately before on display monitor 220 (S21). For example, as illustrated in FIG. 11, the moving picture that is recorded immediately before is displayed on display monitor 220. At this time, controller 180 may display one of the plurality of frame images (still picture) that constitutes the recorded moving picture.

Figure 12B:
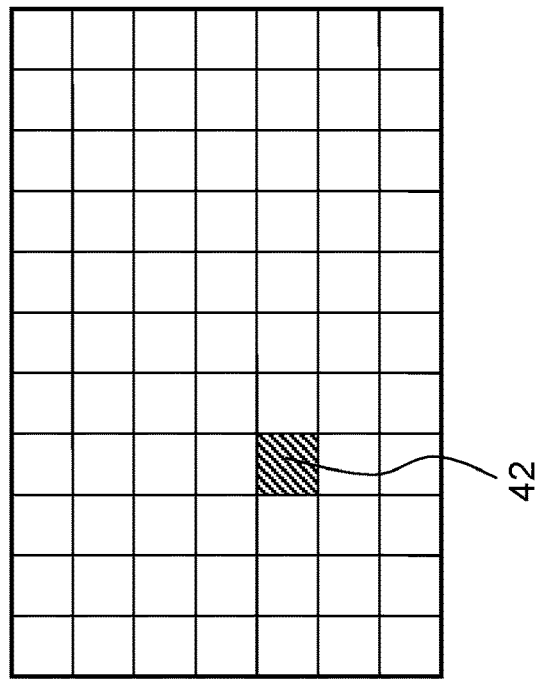
FIG. 12B is a diagram illustrating the operation of designating the desired region to be in focus made by the user.
Figure 12A:
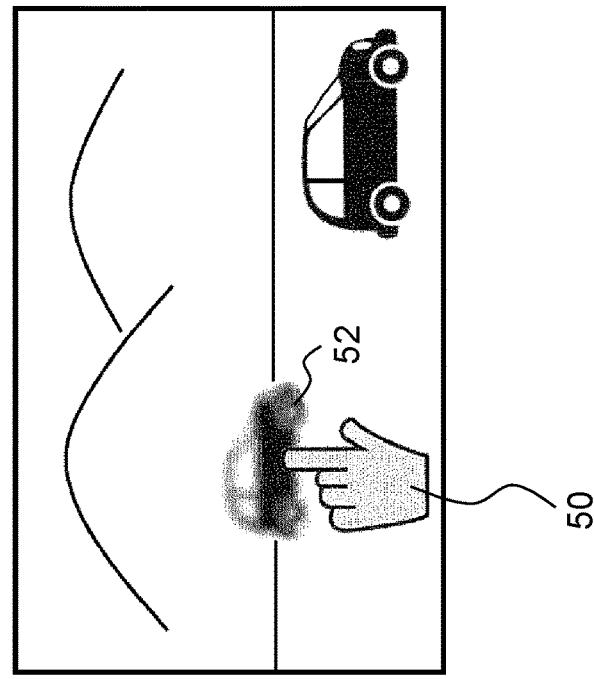
FIG. 12A is a diagram illustrating an operation of designating the desired region to be in focus made by the user.

The user operates touch panel 222 provided on the rear of the camera to designate the subject (that is, region) the user wants to bring into focus on the displayed image. For example, as illustrated in FIG. 12A, user 50 designates subject 52 as an object (region) to bring into focus by touching subject 52.

When the subject (that is, region) is designated by the user (YES in S22), controller 180 identifies the frame in focus on the region designated by the user with reference to focus information table 60 (S23). For example, as illustrated in FIG. 12A, when subject 52 is designated by the user, as illustrated in FIG. 12B, controller 180 identifies region 42 corresponding to subject 52, and then acquires the frame number of the frame in focus on region 42 with reference to focus information table 60.

Figure 13:
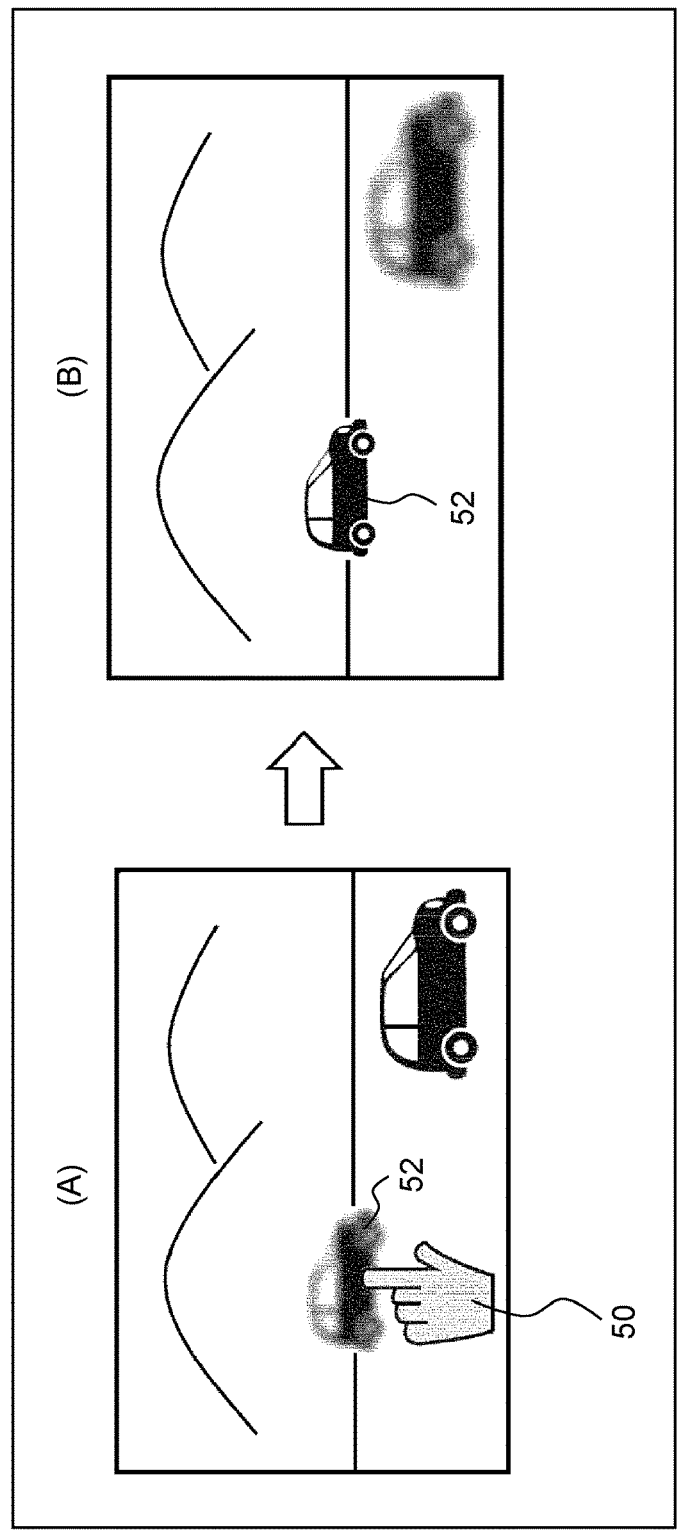
FIG. 13 is a diagram illustrating a display example of an image in focus on the region designated by the user.

Then, controller 180 displays the frame image of the identified frame number on display monitor 220 (S24). For example, when subject 52 is designated by user 50 in the image illustrated in (A) of FIG. 13, the image that is in focus on designated subject 52 is displayed as illustrated in (B) of FIG. 13.

When the image displayed on display monitor 220 is the desired image, the user can decide the image as the still picture to be recorded by depression of decision button 214. On the other hand, when the image displayed on display monitor 220 is not the desired image, the user can switch the image to be displayed on display monitor 220 by operations of selection button 213 or the focus ring.

When the operation to switch the image is performed by the user (S27), in response to the operation, controller 180 switches the image to be displayed on display monitor 220 (S28). The user can cause display monitor 220 to display the desired image by performing the switching operation as appropriate. Details of this switching operation of the display image will be described later.

When decision button 214 is pressed down by the user (S25), the image (frame image) that is being displayed is cut out as the still picture and is recorded in memory card 200 (S26). For example, when decision button 214 is pressed down, a confirmation message for the user may be displayed on display monitor 220. Then, when an instruction of the user ("YES") is input for the confirmation message, controller 180 may extract data of the frame image that is being displayed from the moving picture data, and may record the data in memory card 200 as the still picture. It is to be noted that the still picture data may be recorded in built-in memory 240 or other recording medium instead of or in addition to memory card 200. In addition, the still picture data may be transmitted outside of digital camera 100 by using the wireless communication function of the unillustrated wireless communication unit such as Wi-Fi, instead of or in addition to being recorded in a recording medium such as memory card 200. In this case, the still picture data is transmitted outside of digital camera 100 from a transmitting unit of the wireless communication unit.

The moving picture data is recorded by a codec for moving pictures (such as H.264 and H.265) and undergoes inter-frame compression. Accordingly, when cutting out the frame of the moving picture data as the still picture, controller 180 converts the frame image data into a format for still pictures (for example, joint photographic experts group (JPEG)), and records the converted data.

As described above, the still picture data that is in focus on the region designated by the user can be cut out from the moving picture data. That is, the user can obtain the image that is in focus on the desired subject.

2.2.1 Switching of Image (Frame-by-Frame Playback)

The switching operation of display images (frame-by-frame playback) of steps S27 to S28 in the flowchart in FIG. 10 will be described.

After the user designates the region to be in focus, when the image displayed on display monitor 220 is not the image desired by the user, the user can switch the image to be displayed on display monitor 220 by operating selection button 213 or the focus ring (S27 to S28). For example, by rotating the focus ring clockwise, the user can switch the display image to the image frame before or after the current frame in terms of time, that is, the user can perform frame-by-frame playback.

Figure 14:
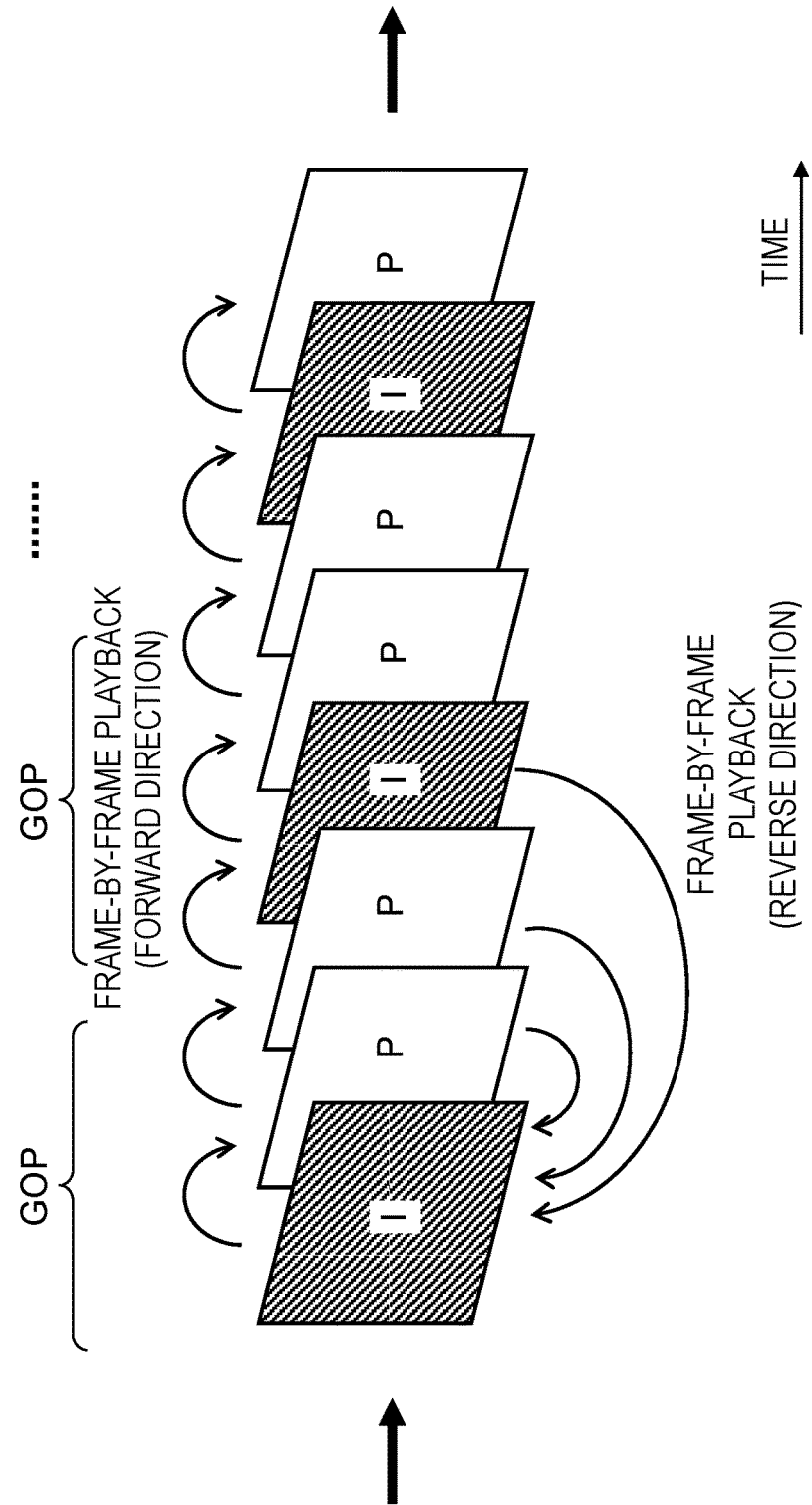
FIG. 14 is a diagram illustrating a switching principle of images by forward frame-by-frame playback/backward frame-by-frame playback.

In particular, in the present exemplary embodiment, as illustrated in FIG. 14, when performing frame-by-frame playback in a forward direction (to a later direction in terms of time), the user performs single-frame-by-single-frame playback. When performing frame-by-frame playback in a reverse direction (to an earlier direction in terms of time), the user returns to an I picture (Intra Picture) immediately before. That is, when the frame-by-frame playback operation in the forward direction is performed, the frame image that is one frame after the currently displayed frame image is displayed on display monitor 220. On the other hand, when the frame-by-frame playback operation in the reverse direction is performed, among the I pictures which are before the currently displayed frame image in terms of time, the image of the I picture closest to the currently displayed frame image is displayed on display monitor 220.

Such frame-by-frame playback control is performed because, when the image to be displayed next is a P picture (Predictive Picture), processing time significantly differs between the frame-by-frame playback in the forward direction and the frame-by-frame playback in the reverse direction. That is, in a case where the image to be displayed next is the P picture, when the frame-by-frame playback is performed in the forward direction, the image to be displayed next can be generated by adding the image information on the frame immediately after the current frame to the image information of the current frame. However, when the frame-by-frame playback is performed in the reverse direction, the image to be displayed next needs to be generated by integration of the image information from the I picture before the current frame to the frame immediately before the current frame, requiring processing time. Therefore, when the frame-by-frame playback is performed in the reverse direction, the user returns to the I picture immediately before, reducing the processing time needed for display.

Figure 15:
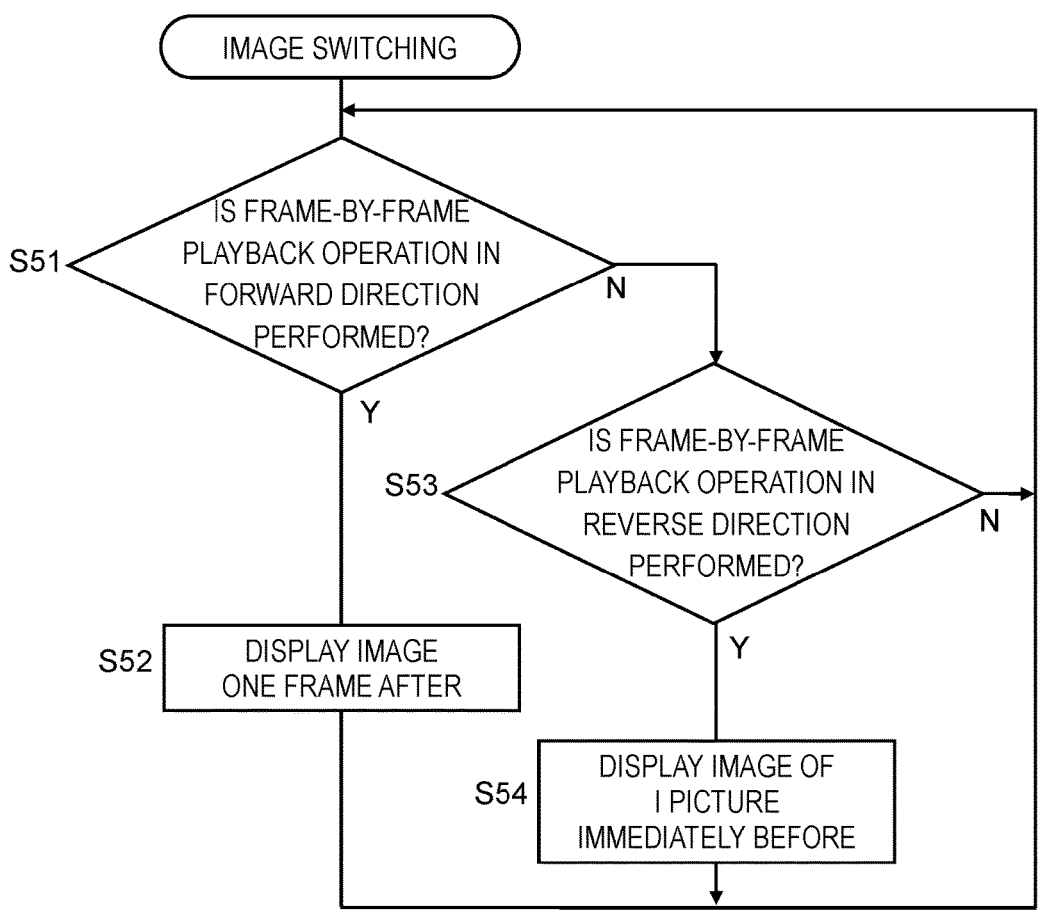
FIG. 15 is a flowchart illustrating a switching (frame-by-frame playback) process of images by forward frame-by-frame playback/backward frame-by-frame playback.

FIG. 15 is a flowchart illustrating the switching operation of display images (frame-by-frame playback). While the image that is in focus on the region designated by the user is displayed on display monitor 220, when the user performs the frame-by-frame playback operation in the forward direction (YES in S51), controller 180 displays the frame image one frame after the current frame (S52).

On the other hand, when the user performs the frame-by-frame playback operation in the reverse direction (YES in S53), controller 180 displays the image of the I picture closest to the current frame among the I pictures which are before the current frame (S54). In this case, for example, a display may be displayed on display monitor 220 for notifying the user that the display image has switched to the frame which is not the frame immediately before.

Here, as an operating member for performing the frame-by-frame playback, a jog dial may be used other than the focus ring or the selection button. In addition, a frame-by-frame playback button may be displayed on display monitor 220. By operating this frame-by-frame playback button, the user can move the displayed image forward and backward in terms of time.

Also, while the foregoing has described an example in which a group of picture (GOP) of the moving picture data includes only the I picture and the P picture, the GOP of the moving picture data may further include a bidirectionally predictive picture (B picture).

2.2.2 Processing when the Frame in Focus (Position in Focus) is Unknown

As described above, during creation of focus information table 60, when all the contrast values of the frames are lower than the predetermined threshold for one region, the frame in focus (that is, the position in focus) is not determined for the region, and a predetermined value indicating that the position in focus is unknown is recorded in focus information table 60.

Figure 10:
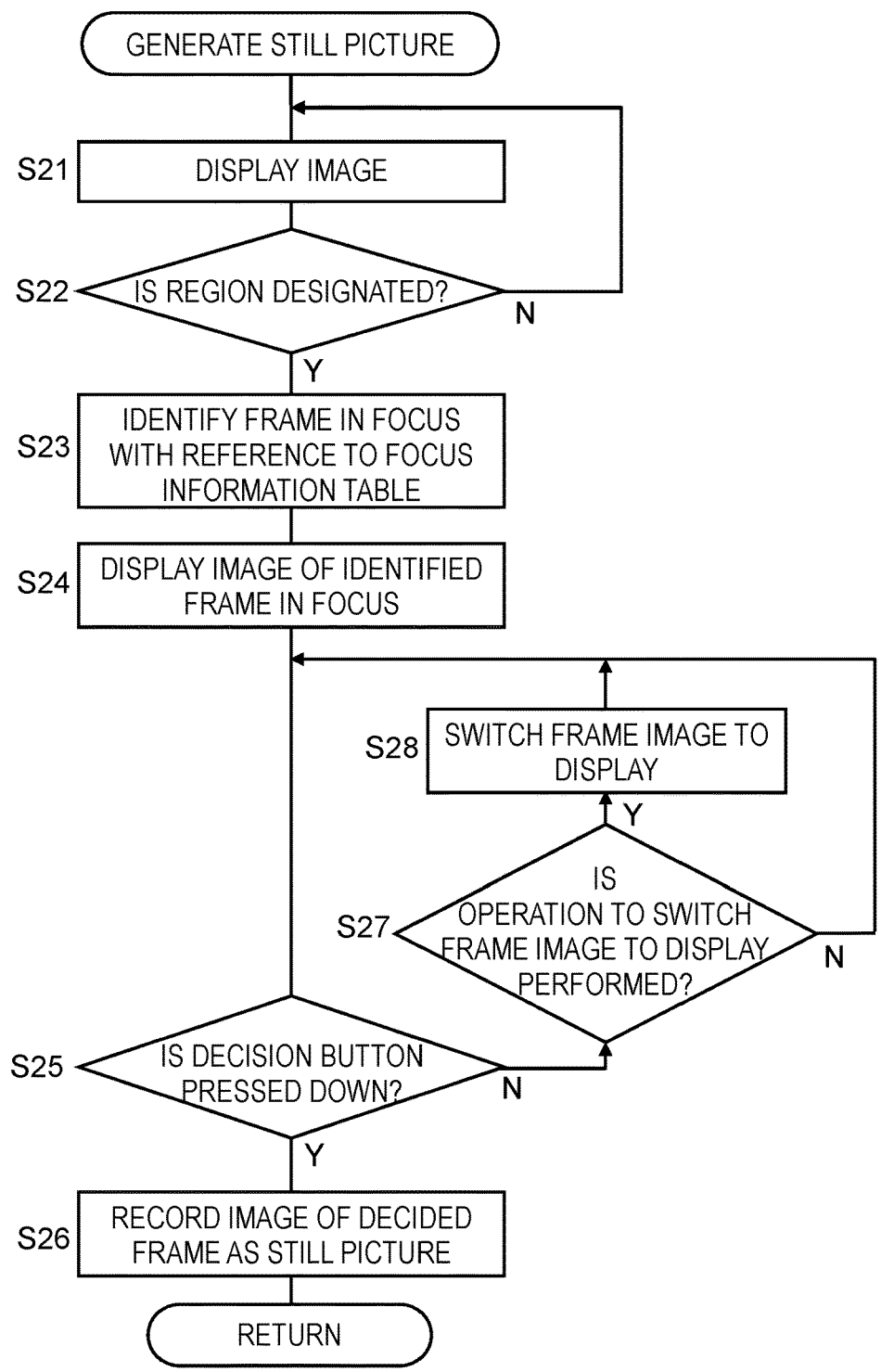
FIG. 10 is a flowchart illustrating a still picture generating process from the moving picture data.

In step S23 of the flowchart of FIG. 10, in the case of identifying the frame in focus on the region designated by the user with reference to focus information table 60, when the position in focus on the region is unknown, controller 180 performs the following process to determine the frame in focus (that is, the position in focus).

Figure 16:
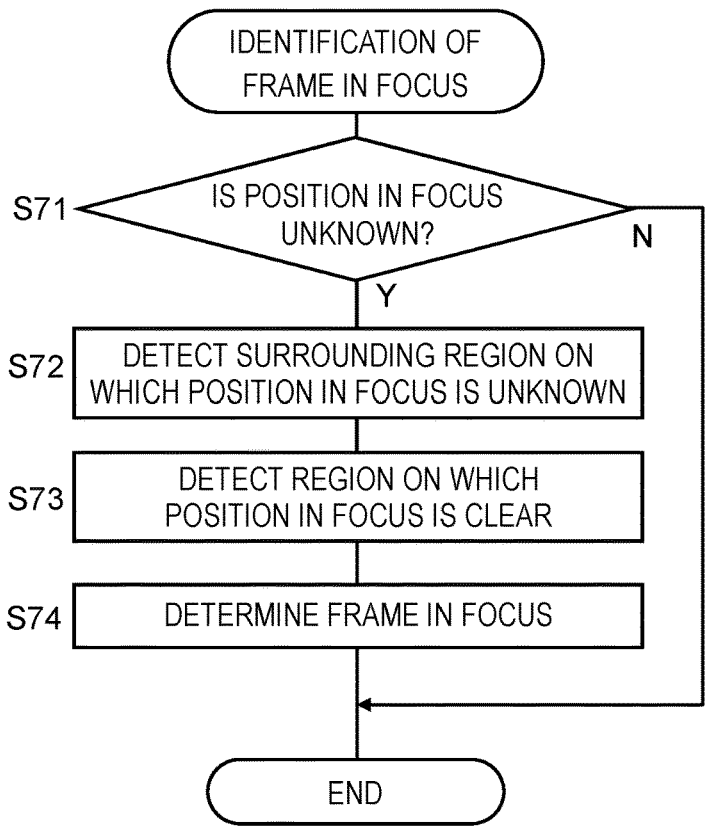
FIG. 16 is a flowchart illustrating a determination process of a frame in focus for a divided region on which a frame in focus (position in focus) is not clear.
Figure 17:
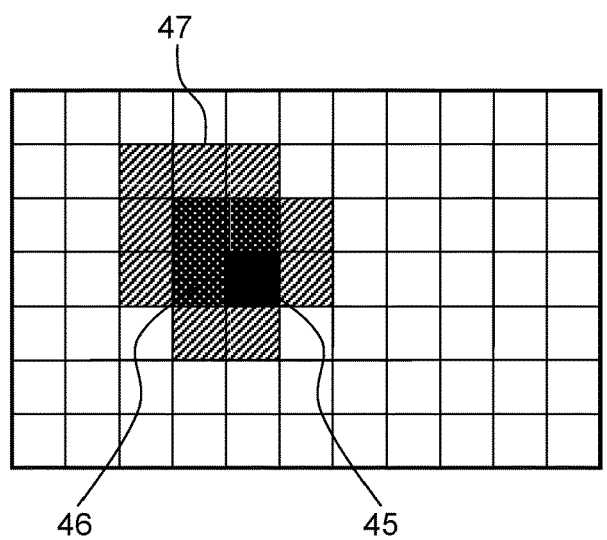
FIG. 17 is a diagram illustrating a determination method of the frame in focus for the divided region on which the frame in focus (position in focus) is not clear.

FIG. 16 is a flowchart illustrating the process for determining the frame in focus on the region on which the position in focus is unknown. When the position in focus on the region of the subject designated by the user is unknown (S71), controller 180 detects a region around the region and on which the position in focus is unknown (S72). For example, as illustrated in FIG. 17, controller 180 detects another region group 46 on which the position in focus is unknown around region 45 on which the position in focus is unknown.

Next, controller 180 detects region group 47 on which the position in focus (that is, the frame in focus) is clear around region groups 45, 46; the positions in focus are unknown on region groups 45, 46 (S73). From the frames in focus on each of region group 47 on which the detected position in focus (that is, the frame in focus) is clear, controller 180 determines the frame in focus with the largest number as the frame in focus on region 45 on which the position in focus is unknown (S74).

As described above, the frame in focus can be determined on the region on which the position in focus is unknown.

3. Advantageous Effects

Digital camera 100 according to the present exemplary embodiment includes optical system 110, CCD 140 (one example of imaging element), image processor 160, operating member 210 (one example of input unit), and controller 180. Optical system 110 includes focus lens 111. CCD 140 generates the image signal from optical information that is input via optical system 110. Image processor 160 performs a predetermined processing on the image signal generated by CCD 140, and then generates the moving picture data including the plurality of frame images. Operating member 210 receives input of the designated region on the image made by the user. Controller 180 causes image processor 160 to generate the moving picture data while moving a focus position of optical system 110, and then extracts the still picture that is in focus on the designated region from among the plurality of frame images included in the moving picture data. Controller 180 may record the extracted still picture in memory card 200 (one example of the predetermined recording medium).

As described above, digital camera 100 according to the present exemplary embodiment extracts the still picture (frame image or frame in focus) that is in focus on the region designated by the user from the moving picture data captured while changing the focus position. Accordingly, the user can easily obtain the still picture that is in focus on the desired image region (subject) by designating the region of the image by touch. In addition, generating the still picture from the moving picture captured while continuously changing the focus position allows the user to obtain the image that is in focus on any subject included within an angle of view during capturing of the moving picture.

Also, digital camera 100 may store focus information table 60 (one example of the table) that manages each of the plurality of regions obtained by dividing the image region of the image data and information indicating the frame image that is in focus on each region in association with each other. Controller 180 can identify the frame image that is in focus on the region designated by the user with reference to focus information table 60.

Also, before the moving picture recording operation, controller 180 may perform the prescan operation to detect the focus state on each region while moving the focus lens and to generate focus information table 60.

Also, controller 180 may record the moving picture while moving the focus lens between the position in focus closest to the close end (Pnear) and the position in focus closest to the infinite end (Pfar) resulting from the prescan operation. This prevents recording of the moving picture in a range of the focus lens position that is not in focus, enabling efficient recording of the moving picture.

When the frame image that is in focus on one region is not obtained, controller 180 may determine the frame image that is in focus on the one region from the frame images for a region group around the one region, the region group including regions on each of which the frame image in focus is obtained. Accordingly, even when the region where focus is not obtained is selected, the image in focus on the region near the above region is recorded as the still picture.

Digital camera 100 may further include display monitor 220 (one example of display) that displays the frame image for the user to designate the region. The moving picture data includes the I pictures (one example of a first image) generated without reference to information on other frame images, and the P pictures (one example of a second image) generated with reference to the I pictures. When the user performs the image switching operation in the forward direction on the frame image displayed on display monitor 220, controller 180 may display the frame image one frame after the currently displayed frame image in terms of time. Meanwhile, when the user performs the image switching operation in the reverse direction on the frame image displayed on display monitor 220, controller 180 may display the I picture closest to the currently displayed frame image among the I pictures which are before the currently displayed frame image in terms of time. This enables quick image display switching and allows user convenience to be secured.

Other Exemplary Embodiments

As described above, the first exemplary embodiment has been described as illustration of the technology to be disclosed in this application. The technology in the present disclosure however is not limited to this exemplary embodiment, and may be applied to exemplary embodiments to which changes, replacements, additions, and omissions have been made as appropriate. It is also possible to make a new exemplary embodiment by combining components described in the aforementioned first exemplary embodiment and other elements. Therefore, other exemplary embodiments will be illustrated below.

(1) In the above-described exemplary embodiment, in the focus bracketing operation, the prescan operation is performed before recording of the moving picture, and focus information table 60 is created. Since the prescan operation allows recognition of the boundary position in focus where focus is obtained, an effective range to move the focus lens during recording of the moving picture can be set, providing an advantage that the moving picture can be recorded efficiently. However, the prescan operation is not essential, and focus information table 60 may be simultaneously created during recording of the moving picture. This method provides an advantage that the angle of view does not change between a time of recording the moving picture and a time of generating the focus information.

(2) In the above-described exemplary embodiment, focus information table 60 stores the position in focus on the closest end side (Pnear) and the position in focus on the most infinite end side (Pfar). However, these positions in focus (Pnear, Pfar) do not necessarily need to be stored in focus information table 60, and may be held independently of focus information table 60.

(3) In the above-described exemplary embodiment, for each region of the image, focus information table 60 stores information (frame number) that indicates the frame in focus on the region (frame in focus). However, structure of focus information table 60 is not limited to this example. For each region of the image, the focus information table may store the position of focus lens 111 when focus is obtained on each region. In this case, a second table may further be created indicating a relationship between the position of the focus lens and each frame during recording of the moving picture. When the still picture is cut out, the frame image to be cut out from the moving picture can be identified with reference to the focus information table and the second table.

(4) In the above-described exemplary embodiment, contrast AF is used as an automatic focus method; phase difference AF may also be used.

(5) The focus bracketing function disclosed in the above-described exemplary embodiment is applicable to both types of digital cameras, an interchangeable-lens camera and a lens integrated camera.

(6) In the above-described exemplary embodiment, description is made using a digital camera as one example of the image pickup device; the image pickup device is not limited to this example. An idea of the present disclosure is applicable to various image pickup devices capable of capturing moving pictures, such as a digital camcorder, a smartphone, and a wearable camera.

(7) In the above-described exemplary embodiment, the imaging element includes a CCD; the imaging element is not limited to this example. The imaging element may include an N-channel metal oxide semiconductor (NMOS) image sensor or a complementary metal oxide semiconductor (CMOS) image sensor.

As described above, the exemplary embodiment has been described as illustration of the technology in the present disclosure. For this purpose, the accompanying drawings and detailed description have been provided. Accordingly, the components described in the accompanying drawings and detailed description may include not only components essential for solving problems but also components unessential for solving problems, in order to illustrate the technology. Therefore, it should not be acknowledged immediately that those unessential components be essential because those unessential components are described in the accompanying drawings and detailed description. Also, since the aforementioned exemplary embodiment is intended to illustrate the technology in the present disclosure, various changes, replacements, additions, omissions, and the like may be made within the scope of the appended claims or equivalents thereof.

The present disclosure is applicable to the image pickup device and still picture generating method capable of capturing moving pictures. Specifically, the present disclosure is applicable to various image pickup devices and still picture generating methods capable of capturing moving pictures, such as a digital camcorder, a smartphone, and a wearable camera.

What is claimed is:

1. An image pickup device comprising:
    an optical system comprising a focus lens;
    an imaging element that generates an image signal from optical information that is input via the optical system;
    an image processor that performs a predetermined processing on the image signal generated by the imaging element to generate moving picture data that includes a plurality of frame images;
    an input unit that receives input of a designated region on an image made by a user; and
    a controller that causes the image processor to generate the moving picture data while moving a focus position of the optical system, and extracts a still picture that is in focus on the designated region from among the plurality of frame images included in the moving picture data, wherein:
        the controller generates a table for associating (i) the focus position of the optical system when each of frame images is generated and (ii) a focused region of each of the frame images, the focused region being one of regions divided from an image region of each of the frame images, and
        with reference to the table, the controller identifies a frame image that is in focus on the designated region as the still picture, and
        before causing the image processor to generate the moving picture data, the controller performs a prescan operation, in which a pre-moving picture is captured, while moving the focus position of the optical system, the controller determines a position of the optical system in focus closest to a close end and a position of the optical system in focus closest to an infinite end, resulting from the prescan operation.

2. The image pickup device according to claim 1, wherein the controller uses a result of the scan operation for generation of the table.

3. The image pickup device according to claim 1, wherein the controller generates the moving picture data while moving the focus position of the optical system between a position in focus closest to a close end and a position in focus closest to an infinite end, resulting from the scan operation.

4. The image pickup device according to claim 1, wherein when a frame image that is in focus on one region of the plurality of regions is not obtained, the controller determines the frame image that is in focus on the one region from the frame images for a region group around the one region, the region group including regions on each of which the frame image in focus is obtained.

5. The image pickup device according to claim 1, further comprising a display that displays each of the frame images for inputting the designated region,
wherein the moving picture data includes first frame images generated without reference to information on other frame images and second frame images generated with reference to the first frame images,
when the user performs an image switching operation in a forward direction on a frame image currently displayed on the display, the controller displays one of the frame images that is one frame after the currently displayed frame image in terms of time, and
when the user performs an image switching operation in a reverse direction, the controller displays one of the first frames that is image closest to the currently displayed frame image out of the first frame images that are before the currently displayed frame image in terms of time.

6. The image pickup device according to claim 1, wherein the controller records the extracted still picture in a recording medium.

7. The image pickup device according to claim 1, wherein the controller records the extracted still picture that is in focus on the designated region in a recording medium.

8. The image pickup device according to claim 1, wherein when there is a frame in focus on each of the divided regions, the table stores a frame number of the frame in focus on each of the divided regions.

9. A still picture generating method in an image pickup device, the still picture generating method comprising the steps of:
generating moving picture data including a plurality of frame images while moving a focus position;
generating a table for associating (i) the focus position when each of frame images is generated and (ii) a focused region of each of the frame images, the focused region being one of regions divided from an image region of each of the frame images;
receiving input of a designated region on an image made by a user; and
extracting a still picture that is in focus on the designated region from the plurality of frame images included in the moving picture data, wherein:
with reference to the table, identifying a frame image that is in focus on the designated region as the still picture, and
before generating the moving picture data, performing a prescan operation, in which a pre-moving picture is captured, while moving the focus position, determining a position in focus closest to a close end and a position closest to an infinite end, resulting from the prescan operation.

* * * * *